United States Patent [19]
Shibayama

[11] Patent Number: 5,150,341
[45] Date of Patent: Sep. 22, 1992

[54] DISK FILE APPARATUS
[75] Inventor: Hitoshi Shibayama, Kariya, Japan
[73] Assignee: Aisin Seiki Kabushiki Kaisha, Kariya, Japan
[21] Appl. No.: 499,899
[22] Filed: Mar. 27, 1990
[30] Foreign Application Priority Data
Mar. 31, 1989 [JP] Japan ................................. 1-83343
[51] Int. Cl.[5] ...................... G11B 17/22; G11B 17/04; G11B 15/68; G11B 17/08
[52] U.S. Cl. ........................................ 369/36; 369/33; 369/34; 369/35; 369/178; 360/92; 360/93; 360/98.04
[58] Field of Search ......................... 369/33, 34, 35, 36, 369/37, 38, 178; 360/98.01, 98.04, 98.06, 98.07, 92, 93

[56] References Cited
U.S. PATENT DOCUMENTS

| | | | |
|---|---|---|---|
| 4,787,074 | 11/1988 | Deck et al. | 369/36 |
| 4,815,055 | 3/1989 | Fago, Jr. | 369/36 |
| 4,815,056 | 3/1989 | Toi et al. | 369/36 |
| 4,817,070 | 3/1989 | Hug et al. | 369/36 |
| 4,817,071 | 3/1989 | Carlson et al. | 369/34 |
| 4,827,463 | 5/1989 | Motoyoshi et al. | 369/36 |
| 4,844,679 | 7/1989 | Teranishi | 360/98.01 |
| 4,853,916 | 8/1989 | Tomita | 369/36 |
| 4,878,137 | 10/1989 | Yamashita et al. | 369/36 |

Primary Examiner—Stuart S. Levy
Assistant Examiner—Tan Nguyen
Attorney, Agent, or Firm—Banner, Birch, McKie & Beckett

[57] ABSTRACT

A disk file apparatus wherein a disk cartridge having an optical disk or a magnetic disk stored therein is alternatively loaded between a stocker and a disk driver as a single changer is reciprocated. A first reversing element rotates the changer around a first axis crossing at a right angle with a line connecting the relative directions of a pair of stockers. A second reversing element rotates the changer around a second axis extending toward a linear direction connecting relative directions of the pair of stockers.

11 Claims, 6 Drawing Sheets 5,150,341

DISK FILE APPARATUS

BACKGROUND OF THE INVENTION

1. Field of the Invention

This invention relates to a disk file apparatus in which disk cartridges having optical disks or magnetic disks stored therein are changed over and loaded to stockers and a disk driving means as a changer is reciprocated, and more particularly a mechanism for feeding or discharging disk cartridges to or away from the stockers and the disk driving means.

2. Description of the Related Art

As this type of prior art disk file apparatus, a technology described in Japanese Laid-Open Patent Publication No. 122048/1988 can be applied.

FIG. 6 is an entire schematic view for showing a prior art disk file apparatus disclosed in the above-mentioned gazette. FIG. 7 is a front elevational view for showing a part of the changer in the disk file apparatus shown in FIG. 6.

As shown in FIG. 6, a single stocker 63 for storing a plurality of disk cartridges 62 under their piled-up condition within one side end of a housing 61, and recording and reproducing disk driving means 64 are arranged below the stocker 63. A carrier 65 is arranged in front of the stocker 63 and the disk driving mean 64 in such a way as it may be lifted up or lowered along a supporting column 66, and the carrier is connected to an electric motor 70 through a cable 67, a pulley 68 and a winch 69. To the carrier 65 is fixed a changer 71 for feeding in or feeding out the disk cartridges 62 in respect to the stocker 63 and the disk driving means 64.

As shown in FIG. 7, to the changer 71 is supported a holder 72 for storing the disk cartridge 62 in such a manner as it may be reversely rotated by an electric motor 73. To the changer 71 is arranged a pair of right and left movable wings 74 in such a way as they may be opened or closed through a wire mechanism (not shown) by a common electric motor 75. To each of the movable wings 74 are arranged rollers 76 holding both side surfaces of the disk cartridge 62 in such a way as they be rotated by separate right and left electric motors 77.

Then, operation of the prior art disk file apparatus made as described above will be described.

In case that the disk cartridges 62 are taken out of the stocker 63, at first, the electric motor 75 is rotated, the movable wings 74 of the changer 71 are released (at solid line positions in FIG. 7), then the electric motor 70 is energized and the carrier 65 is arranged at a taking-out position. Subsequently, as the electric motor 75 is rotated in a reverse direction, the wings 74 are closed (at positions of two-dotted line in FIG. 7) and the disk cartridge 62 is held by the rollers 76. As the electric motors 77 are started to operate, the disk cartridge 62 is taken out into the holder 72 as the rollers 76 are rotated. Under this condition, if the holder 72 is rotated by 180° through energization of the electric motor 73, a front side or a rear side of the disk cartridge 62 is reversed.

Upon completion of taking-out of the disk cartridge 62, the movable wings 74 are released and then under this state, the changer 71 is dropped in front of the disk driving means 64 together with the carrier 65. Then, again, the movable wings 74 are closed, resulting in that the rollers 76 holding the disk cartridge 62 are rotated in an opposite direction to that of their taking-out operation. With this arrangement, the disk cartridge 62 is pushed out of the holder 72 and loaded in the disk driving means 64. Upon loading operation, the changer 71 may wait an injecting operation of the disk driving means 64 while releasing the movable wings 74 or may start a loading operation of the next disk cartridge 62.

However, in the prior art disk file apparatus, the stocker 63 could be placed only at a predetermined location within the housing 61 and only one unit of the stocker 63 could be arranged due to the fact that the changer 71 was fixed on the carrier 65 and an orientation of the changer 71 was limited to its one direction. As a result, the number of disk cartridges 62 to be stored was limited and then information exceeding that amount could not be processed with one disk file apparatus.

SUMMARY OF THE INVENTION

In view of the foregoing, it is an object of the present invention to provide a disk file apparatus in which a space within a housing is effectively utilized, the number of disk cartridges to be stored can be increased twice and at the same time the disk cartridges can be positively processed with one changer.

In order to resolve the above-mentioned problem, the disk file apparatus of the present invention is comprised of a pair of stockers oppositely arranged within a housing; disk driving means for performing a recording and a reproduction; a carrier reciprocated between the stocker and the disk driving means; a changer for feeding-in or feeding-out the disk cartridge on the carrier to or away from the disk driving means; a first reverse rotating means for rotating the changer around a first axis crossing at a right angle with a relative direction of the stocker and reverse rotating the changer to a position opposite to one stoker and to another position opposite to the other stocker; and a second reverse rotating means for rotating the changer around a second axis extending in a relative direction of the stocker and reversing a front side and a reverse side of the disk cartridge.

In the disk file apparatus of the present invention, the changer is reverse rotated by the first reverse rotating means to one position opposite to one stocker and another position opposite to the other stocker. Due to this fact, the changer may selectively take out the disk cartridge from both stockers and load it in the disk driving means and in turn store selectively the disk cartridge taken out of the disk driving means to both stockers. Accordingly, several disk cartridges can be stored within a pair of stockers by utilizing effectively a space within the housing and further they may be positively processed with one changer. In addition, if the changer is rotated by the second reverse rotating means, each of the disk cartridge taken out of one stocker and disk cartridge taken out of the other stocker can be reversed at their front and rear surfaces and then loaded into the disk driving means.

As described above, the disk file apparatus of the present invention is comprised of a carrier reciprocated between a pair of stockers oppositely arranged within the housing and the disk driving means for performing a recording and a reproduction; a changer for loading or unloading the disk cartridge on the carrier into or away from the stocker and the disk driving means; a first reverse rotating means for rotating the changer around a first axis crossing at a right angle with an opposing direction of the stocker and reverse rotating the changer to one position opposite to one stocker and another position opposite to the other stocker; and a second reverse rotating means for rotating the changer around a second axis extending in a relative direction of the stocker and reverse turning a front surface or a rear surface of the disk cartridge.

Accordingly, the changer may enable the disk cartridge to be selectively taken out from both stockers and loaded in the disk driving means and in turn the disk cartridge taken out of the disk driving means to be selectively stored within both stockers, resulting in that a space within the housing can be effectively utilized, several disk cartridges can be stored within a pair of stockers and further they can be positively processed with only one changer.

BRIEF DESCRIPTION OF THE ACCOMPANYING DRAWINGS

DESCRIPTION OF THE PREFERRED EMBODIMENT

Figure 1:
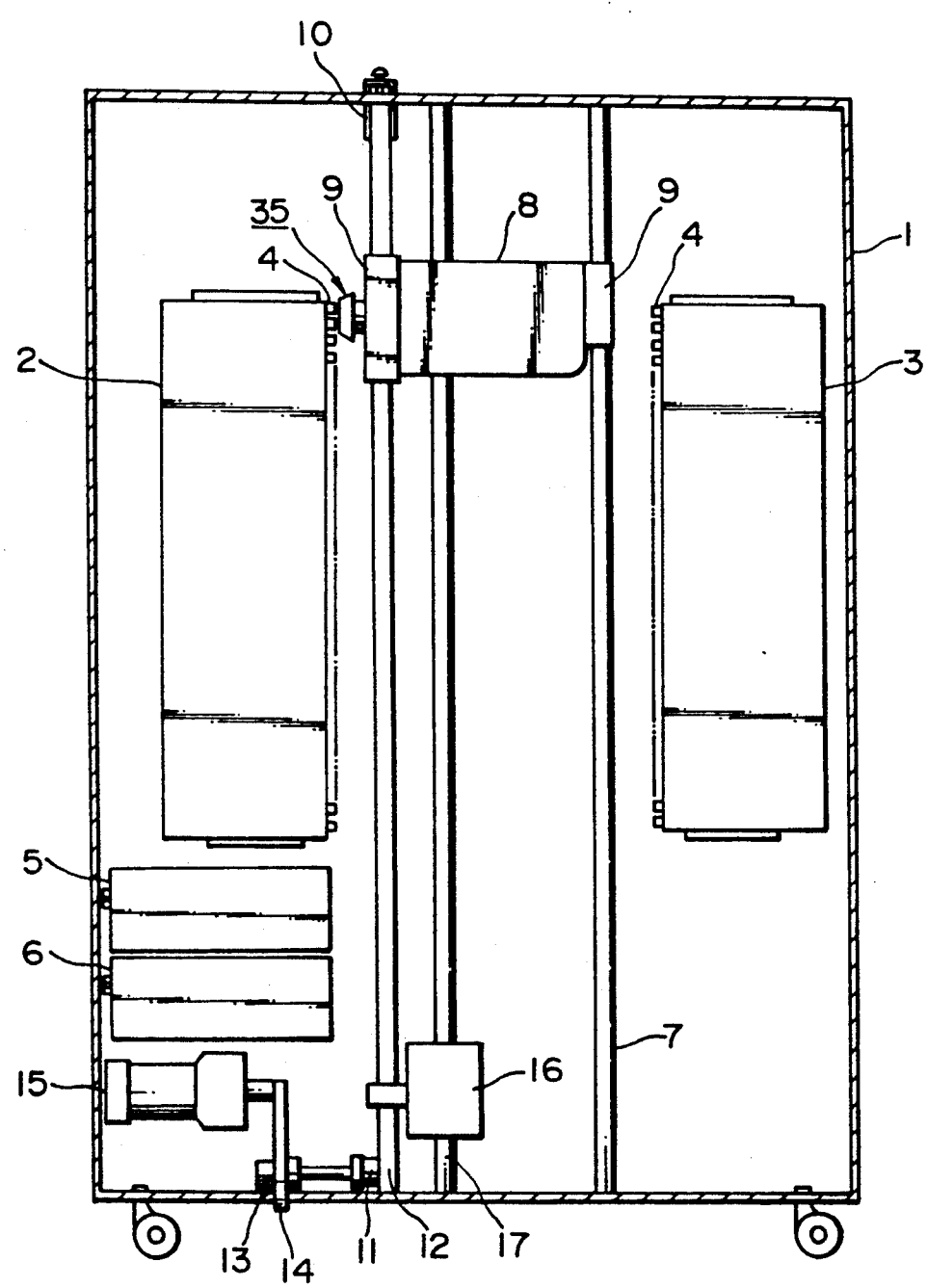
FIG. 1 is a side elevational view for showing an entire disk file apparatus of one preferred embodiment of the present invention.

Referring now to the drawings, one preferred embodiment of the present invention will be described.

Figure 2:
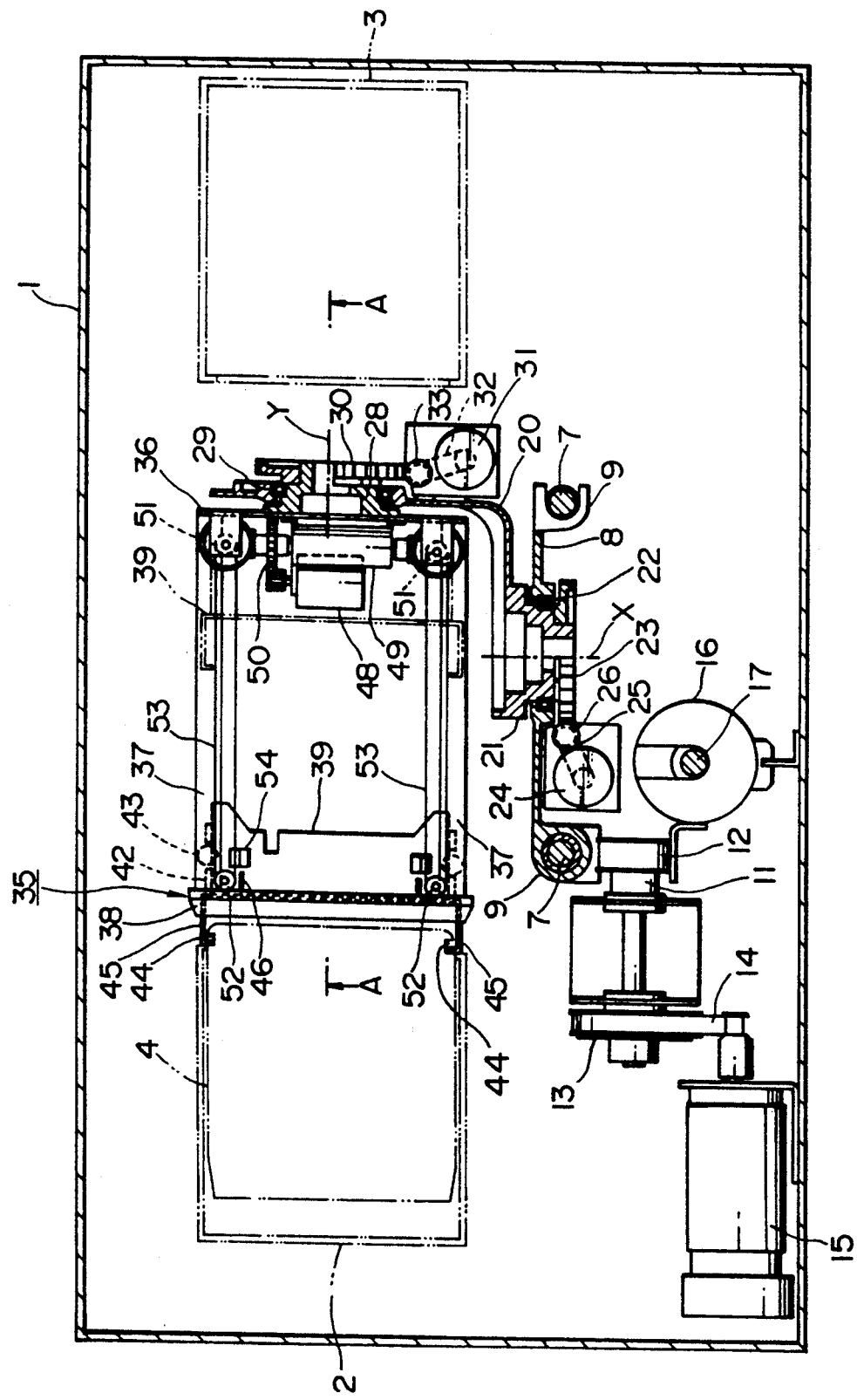
FIG. 2 is an enlarged top plan view in section for showing a disk file apparatus of FIG. 1.
Figure 3:
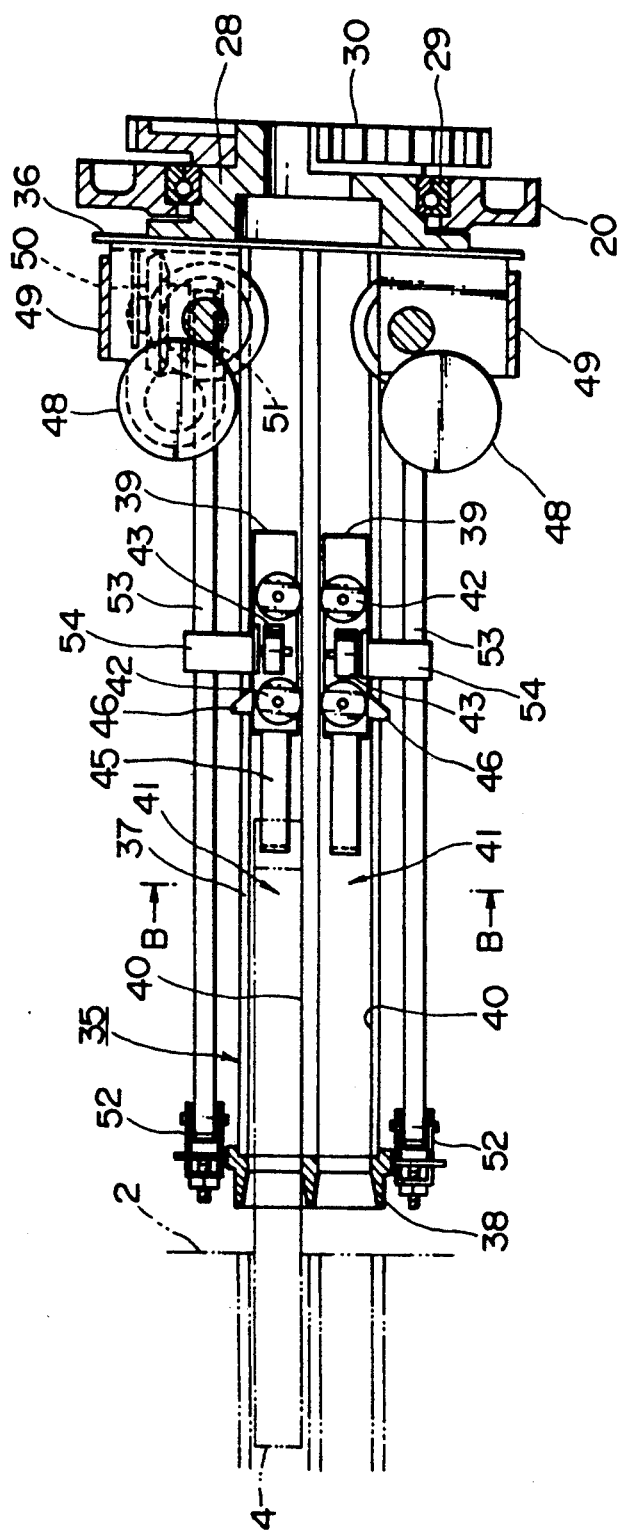
FIG. 3 is an enlarged sectional view taken along a line A—A of FIG. 2.
Figure 4:
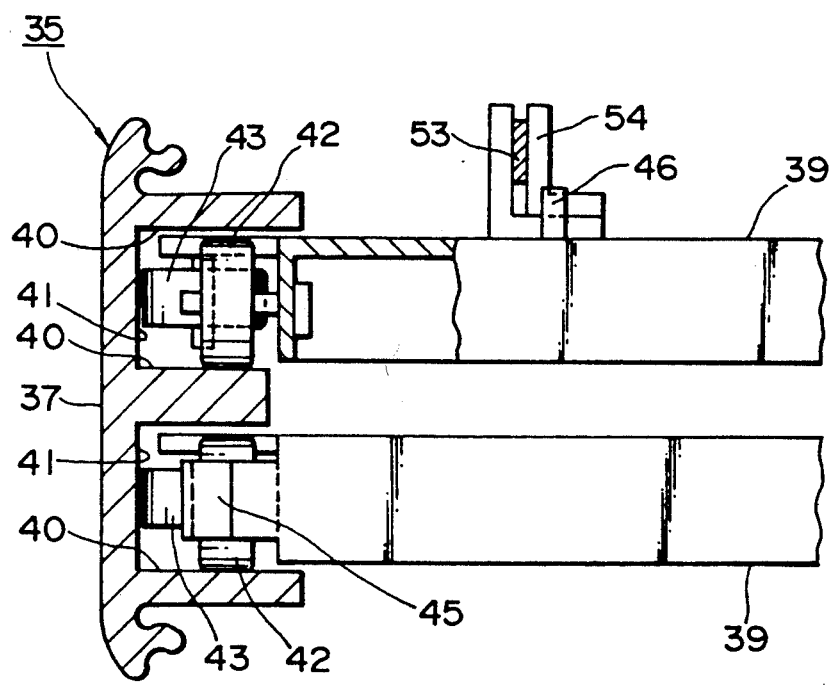
FIG. 4 is an enlarged sectional view taken along a line B—B of FIG. 3.
Figure 5:
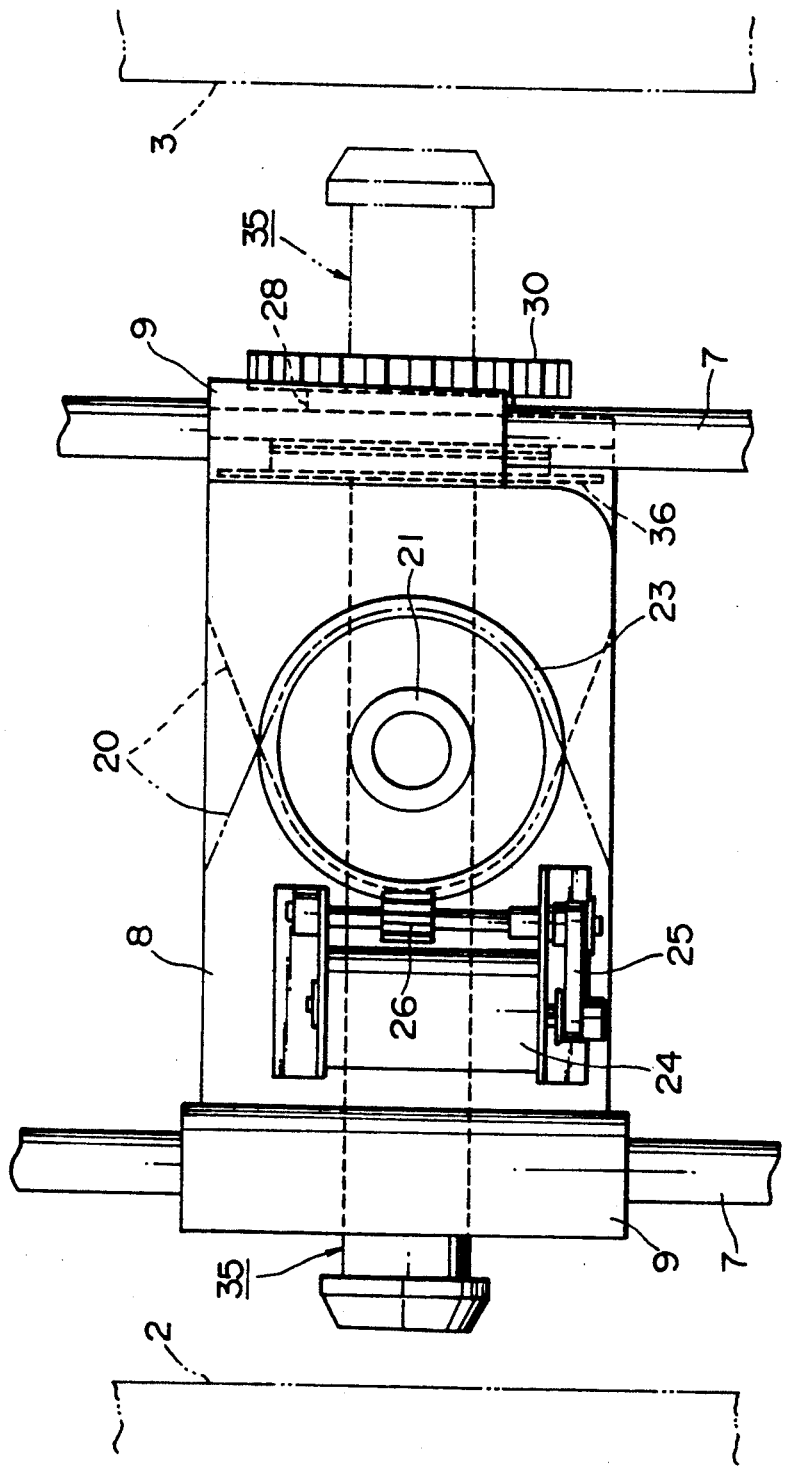
FIG. 5 is a partial enlarged side elevational view of FIG. 1 for showing a reverse rotating operation of the changer.
Figure 6:
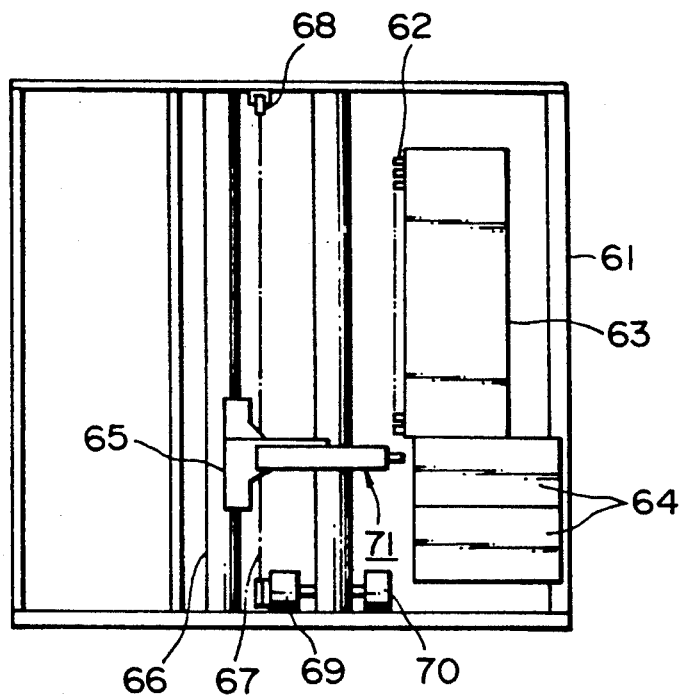
FIG. 6 is a schematic view for showing an entire disk file apparatus of the prior art.
Figure 7:
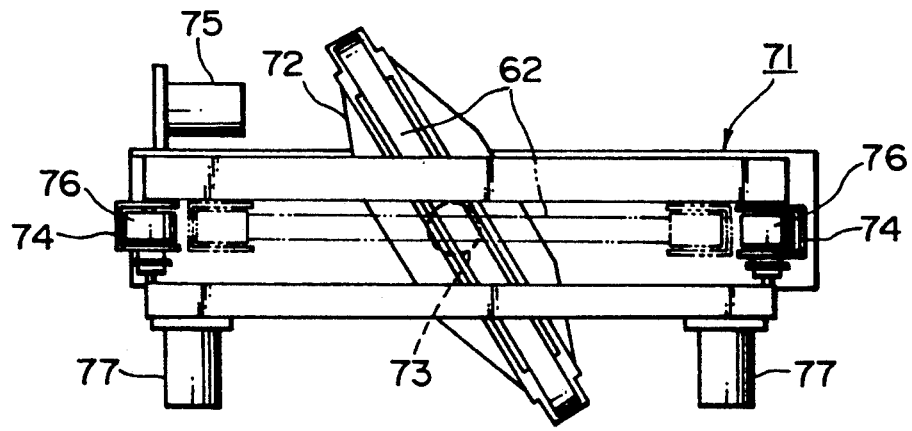
FIG. 7 is a front elevational view for showing a part of the changer of the disk file apparatus of FIG. 6.

FIG. 1 is a side elevational view for showing an entire disk file apparatus of one preferred embodiment of the present invention with a housing being broken away. FIG. 2 is an enlarged top plan view in section for showing the disk file apparatus of FIG. 1. FIG. 3 is an enlarged sectional view in section taken along a line A—A of FIG. 2. FIG. 4 is an enlarged sectional view taken along a line B—B of FIG. 3. FIG. 5 is a partial enlarged side elevational view of FIG. 1 for showing a reverse rotating operation of the changer.

As shown in FIGS. 1 and 2, a first stocker 2 and a second stocker 3 are oppositely arranged within a housing 1 of the disk file apparatus of the preferred embodiment of the present invention with their openings being faced inwardly under a predetermined spacing therebetween, and a plurality of disk cartridges 4 are stored within each of the stockers 2 and 3 while being vertically piled up therein. A first driving means 5 and a second driving means 6 for performing a recording and a reproduction are arranged in upper and lower stages within the housing 1 at positions adjacent below the first forward stocker 2 (a left side in FIG. 1).

The carrier 8 is slidably supported by sliding portions 9 at both forward and rearward ends of the carrier at a pair of forward and rearward supporting columns 7 vertically installed between the first stocker 2 and the second stocker 3. A lifting or descending belt 12 extending in parallel with the forward supporting column 7 is arranged between a driven pulley 10 having a tensioner supported at a ceiling part of the housing 1 and a driving pulley 11 mounted at a floor part of the housing 1. To the lifting or descending belt 12 is fixed a forward sliding portion 9 of the carrier 8. The driving pulley 11 is connected to a lifting o descending electric motor 15 through a pulley 13 and a belt 14. As the lifting or descending belt 12 is rotated under a normal or reverse rotation of the lifting or descending electric motor 15, the carrier 8 is reciprocated vertically along the supporting columns 7 between the upper-most lifting position opposing to the upper ends of the first stocker 2 and the second stocker 3 and the lowest descending position opposing to the second disk driving device 6. In order to make a smooth reciprocation of the carrier 8, a balancing weight 16 is lifted up or descended along the guiding column 17 as the lifting-up or descending belt 12 is rotated.

As shown in FIGS. 2 and 5, an L-shaped first rotating member 20 is rotatably supported at a substantial central part of the carrier 8 by a stepped cylinder 21 through a bearing 22, and a driven gear 23 is fixed to a projecting end of the stepped cylinder 21. A first driving mechanism for use in driving the first rotating member 20 is comprised of a first electric motor 24 for reversing operation, a belt 25 and a driving gear 26 which are mounted at an outside surface of the carrier 8 and constructed such that the first rotating member 20 is reversely rotated by about 180° through an engagement between the driving gear 26 and the driven gear 23 as the first electric motor 24 for reversing operation is operated. The first rotating member 20 is rotated around a first axis (see FIG. 2) crossing at a right angle with a relative direction between the first stocker 2 and the second stocker 3 and a moving direction of the carrier 8, respectively.

As shown in FIGS. 2 and 3, a second stepped cylindrical rotating member 28 is rotatably supported at a free end of the first L shaped rotating member 20 through a bearing 29, and a driven gear 30 is fixed to a projecting end of the second rotating member 28. A second driving mechanism for use in driving the second rotating member 28 is comprised of a second electric motor 31 for a reverse rotating operation, a belt 32 and a driving gear 33 which are mounted at an outside surface of the first rotating member 20, and this is operated such that the second rotating member 28 is reversely rotated by about 180° through an engagement between the driving gear 33 and the driven gear 30 as the second electric motor 31 for a reverse rotation is normally or reversely rotated. The second rotating member 28 is rotated around a second axis Y (see FIG. 2) extending in a relative direction between the first stocker 2 and the second stocker 3.

The second rotating member 28 is provided with the first stocker 2, the second stocker 3, and a changer 35 for loading or unloading the disk cartridges 4 in respect to the first disk driving means 5 and the second disk driving means 6. The changer 35 is comprised of a fixed plate 36 fixed to an inside surface of the second rotating member 28, a pair of rail members 37 having base ends connected to the fixed plate 36 and extending in parallel oppositely from the fixed plate, an open frame 38 covered over the extremity ends of both rail members 37 and a pair of upper and lower holders 39 stored inside both rail members 37 in such a way as they may be moved in forward and rearward directions.

As shown in FIGS. 3 and 4, a pair of rail members 37 are formed by an aluminum extruded member into a substantial E-shape in section, and upper and lower two stages of the horizontal guide surfaces 40 and vertical guide surfaces 41 are formed inside the rail members. Each of a pair of holders 39 is made to have a substantial same shape, respectively. Both right and left side surfaces of the pair of holders 39 are provided with rollers 42 guided by the horizontal guide surfaces 40 for the rail members 37 and the rollers 43 guided by the vertical guide surfaces 41. An end surface of the open frame 38 at the holders 39 has a pair of right and left cartridges hooks 45 which can be engaged with recesses 44 at the extremity end of the disk cartridge 4 (see FIG. 2). In FIG. 3, reference numeral 46 denotes stoppers projected at the holders 39 and the stoppers are engaged with the open frame 38 so as to restrict a forward moving position of each of the holders 39.

As shown in FIGS. 2 and 3, an inside part of the fixed plate 36 is provided with a pair of upper and lower electric motors 48 for use in separately driving the pair of holders 39 through brackets 49. To each of the electric motors 48 is connected a driving pulley 51 through a gear mechanism 50, and a belt 53 is mounted in tension between the driving pulley 51 and a driven pulley 52 having a tensioner on the open frame 38. To the belts 53 are connected holding portions 54 projected form the holders 39 and then the holders 39 are reciprocated between their forwarded positions indicated by solid lines in FIG. 2 and their retracted positions indicated by two-dotted lines in FIG. 2 through belts 53 as the electric motors 48 are normally or reversely rotated.

Operation of the disk file apparatus of the preferred embodiment of the present invention constructed as above will be described.

Under a terminated condition of the disk file apparatus, as shown in FIG. 1, the carrier 8 is placed at its highest lifted position and at the same time the changer 35 is oppositely arranged against the first stocker 2 and further a pair of holders 39 are arranged at their retracted position indicated by two-dotted lines in FIG. 2.

Under this terminated condition, if an operating instruction is generated from a control device (not shown), the disk file apparatus may start an extracting operation of the disk cartridges 4. In this case, if the disk cartridges 4 specified by the control device are stored in the first stocker 2, the electric motor 15 for a lifting-up or a descending operation is energized (under a condition indicated by a solid line in FIG. 5) i.e. under a condition in which the changer 35 is opposed against the first stocker 2 and then the carrier 8 is lowered by a predetermined amount as the lifting or descending belt 12 is rotated, resulting in that the changer 35 is stopped in front of the specified disk cartridge 4 of the first stocker 2.

In turn, in case that the specified disk cartridge 4 is stored within the second stocker 3, at first the first electric motor 24 for reversing operation is energized and the changer 35 is reversed by 180° as the first rotating member 20 is rotated and then oppositely arranged against the second stocker 3 (a condition indicated by two-dotted line in FIG. 5). Subsequent to this operation, the electric motor 15 for a lifting or descending operation is energized and the changer 35 is stopped in front of the specified disk cartridge 4 of the second stocker 3.

In this way, when the changer 35 reaches the specified disk cartridge 4, either one or both electric motors 48 is rotated and as the belts 53 are rotated, either one or two holders 39 is moved to the forward position indicated by a solid line in FIG. 2, resulting in that the cartridge hooks 45 of the holders 39 are engaged with the recesses 44 of the disk cartridge 4. Under this engaged condition, the electric motors 48 are rotated in an opposite direction and as shown in FIG. 3, as the holders 39 are moved back to their retracted positions, the disk cartridge 4 is taken out from either the first holder 2 or the second holder 3 into the changer 35. In this case, in case that the rear surface of the taken-out disk cartridge 4 is requested, the second electric motor 31 for a reverse rotation is energized, the changer 35 is rotated by 180° as the second rotating member 28 is rotated and a front or a rear surface of the disk cartridge 4 is reversed.

Upon completion of a taking-out of the disk cartridge 4, the carrier 8 is lowered under a reenergization of the electric motor 15 for lifting or descending operation and then the charger 35 is stopped in front of the first disk driving means 5 or the second disk driving means 6. Then, in the same manner as that of the former, the holders 39 are moved from their retracted positions to their forwarded positions, and the disk cartridge 4 is loaded in the disk driving means 5 or 6. After loading, the holders 39 are returned back from their forwarded positions to their retracted positions. Under this condition, an ejection of the disk cartridge 4 from the disk driving means 5 o 6 is waited or a loading operation for the disk cartridge 4 is started. The disk cartridge 4 of which recording or reproduction is performed by the disk driving means 5 or 6 is stored within the first stocker 2 or the second stocker 3 under a reverse order to that of the loading operation.

In this way, the disk file apparatus of the present invention in its preferred embodiment is constructed such that the first stocker 2 and the second stocker 3 are oppositely arranged within the housing 1. The first disk driving means 5 and the second disk driving means 6 for use in performing a recording and a reproduction are arranged adjacent below the first stocker 2. The carrier 8 is reciprocatably arranged between the stockers 2, 3 and the disk driving means 5, 6. On the carrier 8 is arranged the changer 35 having two holders 39 for loading or unloading the disk cartridge 4 into or away from the stockers 2, 3 and the disk driving means 5, 6. Between the changer 35 and the carrier 8 are provided a first reversing means for rotating the changer 35 around the first axis X crossing at a right angle with a relative direction between the stockers 2 and 3 and a moving direction of the carrier 8 and reversing the changer 35 to one position opposing against the first stocker 2 and the other position opposing to the second stocker 3, and a second reversing means for rotating the changer 35 around a second axis Y extending in a relative direction between the stockers 2 and 3 and reversing a front surface or a rear surface of the disk cartridge 4. The first reversing means is comprised of a first rotating member 20 of an L-shape having its end rotatably supported around the first axis X in respect to the carrier 8 and a first driving mechanism including a first reversing electric motor 24 for use in driving the first rotating member 20. The second reversing means is comprised of a second rotating member 28 rotatably supported around the second axis Y at a free end of the first rotating member 20 and a second driving mechanism including a second reversing electric motor 31 for driving the second rotating member 28. The changer 35 is installed in the second rotating member 28.

Accordingly, according to the disk file apparatus of the preferred embodiment above, since the changer 35 can be reversed between one position opposing against the first stocker 2 and the other position opposing to the second stocker 3 through the first reversing means, the changer 35 may selectively take out the disk cartridge 4 from both stockers 2 and 3 and load it to the disk driving means 5 and 6. In turn, it is possible to selectively store the disk cartridge 4 taken out of the disk driving means 5 and 6 into both stockers 2 and 3. As a result, the space within the housing 1 can be effectively utilized and several disk cartridges 4 can be stored in a pair of stockers 2 and 3 and further they may be positively processed with one changer 35. If the changer 35 is rotated by the second reversing means, each of the disk cartridge 4 taken out of the first stocker 2 and the disk cartridge 4 taken out of the second stocker 3 with its front surface and rear surface being reversed and then the cartridges can be loaded in the disk driving means 5 and 6.

In addition, in the disk file apparatus of the preferred embodiment above, the second rotating member 28 and the second reversing electric motor 31 are supported at a free end of an L-shaped first rotating member 20, and since the changer 35 is loaded in the second rotating member 28, the changer 35 opposing to the first stocker 2 and the changer 35 opposing the second stocker 3 are be reversed by the single electric motor 31 for its front and rear surfaces, resulting in that the present invention can be contributed to a reduction in number of component parts and a light weight of the part. However, the present invention is not limited to this embodiment, but the present invention may be constructed such that each of the changer 35 opposing to the first stocker 2 and the changer 35 opposing to the second stocker 3 is reversed by a separate electric motor, respectively.

In the disk file apparatus of the preferred embodiment described above, since the changer 35 is rotated around the first axis X crossing at a right angle with a relative direction between the stockers 2 and 3 and a moving direction of the carrier 8 under operation of the first rotating member 20, the first driving mechanism such as the first reversing electric motor 24 is assembled in the side part of the changer 35 so as to provide an effective utilization of the space within the housing. However, the first rotating member 20 is not limited to the configuration of the preferred embodiment above, but it is also possible to arranged the first rotating member 20 over the changer 35 and to cause it to be rotated around a vertical axis crossing at a right angle with a relative direction of the stockers 2 and 3.

In the above-mentioned preferred embodiment, two disk driving means 5 and 6 are arranged below the first stocker 2. However, the present invention is not limited to this embodiment and it could be made to properly increase the number of disk driving means or to mount the disk driving means below or above the second stocker 3. In addition, it is also possible to embody the present invention into a lateral mounting disk file apparatus in which a pair of stockers are arranged laterally and the changer is reciprocated between the stockers in a lateral direction.

What is claimed is:

1. A disk file apparatus comprising:
a pair of stockers arranged to be opposite to each other within a housing and having a plurality of disk cartridges piled up and stored therein;
a disk driving means arranged adjacent to said stockers so as to perform a recording and a reproduction;
a carrier reciprocated between said pair of stockers and said disk driving means;
a changer arranged at said carrier so as to load and unload the disk cartridges into and away from the stockers and the disk driving means;
a first reversing means for rotating said changer around a first axis crossing at a right angle with a line connecting the relative directions of said pair of stockers with a linear line and for reversing the changer between one position opposing against one stocker and the other position opposing against the other stocker; and
a second reversing means for rotating said changer around a second axis extending toward a linear direction connecting relative directions of said pair stockers by a linear line and reversing a top surface and a bottom surface of the disk cartridge.

2. A disk file apparatus as set forth in claim 1,
wherein said first reversing means is comprised of an L-shaped first rotating member with its base end rotatably supported around said first axis in respect to the carrier and of a first driving mechanism for driving said first rotating member,
said second reversing means is comprised of a second rotating member rotatably supported around said second axis at a free end of said first rotating member and of a second driving mechanism for driving said second rotating member and
said changer is installed in said second rotating member.

3. A disk file apparatus as set forth in claim 2,
wherein said first rotating member of said first reversing means is rotatably supported at its base end in respect to the carrier around a first axis crossing at a right angle with each of a relative direction of a pair of stockers and a moving direction of the carrier.

4. A disk file apparatus comprising:
a pair of stockers arranged to be opposite to each other within a housing and having a plurality of disk cartridges piled up and stored therein;
a disk driving means arranged adjacent to said stockers so as to perform a recording and a reproduction;
a carrier reciprocated between said pair of stockers and said disk driving means;
a changer arranged at said carrier so as to load and unload the disk cartridges into and away from the stockers and the disk driving means;
a first reversing means for rotating said changer around a first axis crossing at a right angle with a line connecting the relative directions of said pair of stockers with a linear line and for reversing the changer between one position opposing against one stocker and the other position opposing against the other stocker;
a second reversing means for rotating said changer around a second axis extending toward a linear direction connecting relative directions of said pair stockers by a linear line and reversing a top surface and a bottom surface of the disk cartridge; and
wherein said first reversing means and said second reversing means each have means enabling the first and second reversing means to be operated simultaneously.

5. The disk file apparatus of claim 4 wherein said changer further comprises a hook means for engaging respective recesses in the disk cartridges.

6. The disk file apparatus of claim 3 wherein said changer further comprises a hook means for engaging respective recesses in the disk cartridges.

7. The disk file apparatus of claim 6 wherein said changer is connected to said second rotating member on a first side of said changer and wherein said hook means engages the disk cartridges at a location proximate a second opposite side of said changer.

8. A disk file apparatus comprising:
- a pair of stockers arranged to be opposite to each other within a housing and having a plurality of disk cartridges piled up and stored therein;
- a disk driving means arranged adjacent to said stockers so as to perform a recording and a reproduction;
- a carrier reciprocated between said pair of stockers and said disk means;
- a changer arranged at said carrier so as to load and unload the disk cartridges into and away from the stockers and the disk driving means;
- a first reversing means for rotating said changer around a first axis crossing at a right angle with a line connecting the relative directions of said pair of stockers with a linear line and for reversing the changer between one position opposing against one stocker and the other position opposing against the other stocker;
- a second reversing means for rotating said changer around a second axis extending toward a linear direction connecting relative directions of said pair of stockers by a linear line and reversing a top surface and a bottom surface of the disk cartridge;
- wherein said first reversing means is comprised of an L-shaped first rotating member with its base end rotatably supported around said first axis in respect to the carrier and of a first driving mechanism for driving said first rotating member;
- said second reversing means is comprised of a second rotating member rotatably supported around said second axis at a free end of said first rotating member and of a second driving mechanism for driving said second rotating member;
- said changer is installed in said second rotating member;
- said L-shaped first rotating member is supported by said carrier via a bearing means for reducing friction therebetween;
- said second rotating member is supported by said free end of said first rotating member via a bearing means for reducing friction therebetween;
- said first driving mechanism for driving said L-shaped first rotating member operatively engages said L-shaped first rotating member so as to cause said L-shaped first rotating member to rotate with respect to said carrier; and
- said second driving mechanism for driving said second rotating member operatively engages said second rotating member so as to cause said second rotating member to rotate with respect to said L-shaped first rotating member.

9. The disk file apparatus of claim 8 wherein each said disk driving means, said first driving mechanism, and said second driving mechanism are driven by separate driving motors, said first driving mechanism being driven by a driving first motor mounted on said carrier and said second driving mechanism being driven by a second driving motor mounted on said L-shaped first rotating member.

10. The disk file apparatus of claim 9 wherein a first cylindrical member extends from said base end of said L-shaped first rotating member and through an opening in a wall of said carrier;
- a first driven member which engages said first driving mechanism is fixed to said first cylindrical member on the opposite side of said wall than said L-shaped first rotating member;
- said first motor is mounted on said carrier on the same side of said wall as said first driven member;
- a second cylindrical member extends from said second rotating member and through an opening in said free end of said L-shaped first rotating member;
- a second driven member which engages said first driving mechanism is fixed to said second cylindrical member on the opposite side of said L-shaped first rotating member than said second rotating member; and
- said second motor is mounted on said L-shaped first rotating member on the same side as said second driven member.

11. A disk file apparatus comprising:
- a pair of stockers arranged to be opposite to each other within a housing and having a plurality of disk cartridges piled up and stored therein;
- a disk driving means arranged adjacent to said stockers so as to perform a recording and a reproduction;
- a carrier reciprocated between said pair of stockers and said disk driving means;
- a changer arranged at said carrier so as to load and unload the disk cartridges into and away from the stockers and the disk driving means;
- a first reversing means for rotating said changer around a first axis crossing at a right angle with a line connecting the relative directions of said pair of stockers with a linear line and for reversing the changer between one position opposing against one stocker and the other position opposing against the other stocker;
- a second reversing means for rotating said changer around a second axis extending toward a linear direction connecting relative directions of said pair of stockers by a linear line and reversing a top surface and a bottom surface of the disk cartridge;
- wherein said first reversing means is comprised of a first rotating member rotatably supported around said first axis by said carrier;
- said second reversing means is comprised of a second rotating member rotatably supported around said second axis by first rotating member;
- said changer is mounted on said second rotating member;
- said first rotating member is supported by said carrier via a means for reducing friction therebetween;
- said second rotating member is supported by said free end of said first rotating member via a means for reducing friction therebetween;
- a first driving means for driving said first rotating member operatively engages said first rotating member so as to cause said first rotating member to rotate with respect to said carrier;
- a second driving means for driving said second rotating member operatively engages said second rotating member so as to cause said second rotating member to rotate with respect to said first rotating member.

* * * * *